(12) United States Patent
Wu

(10) Patent No.: US 11,506,966 B2
(45) Date of Patent: Nov. 22, 2022

(54) PROJECTION SYSTEM AND PROJECTION METHOD

(71) Applicant: Coretronic Corporation, Hsin-Chu (TW)

(72) Inventor: Chia-Keng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/463,513

(22) Filed: Aug. 31, 2021

(65) Prior Publication Data

US 2022/0082919 A1    Mar. 17, 2022

(30) Foreign Application Priority Data

Sep. 11, 2020   (CN) .......................... 202010950894.6

(51) Int. Cl.
*G03B 21/20* (2006.01)
*G03B 21/56* (2006.01)

(52) U.S. Cl.
CPC ......... *G03B 21/2046* (2013.01); *G03B 21/56* (2013.01)

(58) Field of Classification Search
CPC .. H04N 9/3141; H04N 9/3152; H04N 9/3155; H04N 9/3185; H04N 9/3188; H04N 9/3194; H04N 5/74; H04N 5/76; H04N 5/23212; H04N 5/23218; H04N 5/23219; H04N 5/23293; H04N 5/232945; G03B 21/56; G03B 21/145; G03B 21/147; G03B 21/208; G03B 21/2046; G03B 21/2053

See application file for complete search history.

(56) References Cited

U.S. PATENT DOCUMENTS

| 2014/0191945 | A1* | 7/2014 | Wang | G06F 1/1601 345/156 |
| 2015/0177601 | A1* | 6/2015 | Imai | G03B 21/142 353/121 |

FOREIGN PATENT DOCUMENTS

TW        201436576        9/2014

* cited by examiner

*Primary Examiner* — Sultan Chowdhury
(74) *Attorney, Agent, or Firm* — JCIPRNET

(57) ABSTRACT

The disclosure provides a projection system and a projection method. The projection system includes a screen, a projector, a first posture sensor and a correction controller. The projector projects a display image onto the screen. The first posture sensor is disposed on the screen and configured to measure first angle information of the screen, and the first posture sensor extends along a first direction, and the first direction is parallel to a normal direction of the screen. The correction controller is connected to the projector. The correction controller determines whether to adjust the display image of the projector according to the first angle information. The disclosure further provides a projection method using the projection system. The projection system and projection method of the disclosure have lower hardware requirements and shorter correction processing time.

14 Claims, 6 Drawing Sheets

PROJECTION SYSTEM AND PROJECTION METHOD

CROSS-REFERENCE TO RELATED APPLICATION

This application claims the priority benefit of China application serial no. 202010950894.6, filed on Sep. 11, 2020. The entirety of the above-mentioned patent application is hereby incorporated by reference herein and made a part of this specification.

BACKGROUND

Technical Field

The disclosure relates to a display system and method, and more particularly to a projection system and projection method.

Description of Related Art

When a projector is working, an image sensor (camera) can be used to capture the screen and/or the display image on the screen to determine whether the image shape needs to be calibrated or corrected. In this method, by using an image processing method, it is necessary to use a central processing unit (CPU) or a graphics processing unit (GPU) with higher computing power, which can determine the three-dimensional position or angle relationship between the projector and the screen based on the two-dimensional image. However, when feature points are insufficient, the determination of the position or angle relationship may fail. In this case, it may be necessary to install more expensive hardware to perform the correction of the projection image, and a large amount of extra time is required to perform the correction calculation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection system and a projection method, which use a first posture sensor to measure a normal direction of a screen to determine whether to correct a display image of a projector.

Other objects and advantages of the disclosure may be further understood from the technical features disclosed herein.

In order to achieve one or a part or all of the above or other objects, an embodiment of the disclosure provides a projection system. The projection system includes a screen, a projector, a first posture sensor and a correction controller. The projector projects a display image onto the screen. The first posture sensor is disposed on the screen and configured to measure first angle information of the screen. A disposition direction of the first posture sensor is parallel to a normal direction of the screen. The correction controller is electrically connected to the projector. The correction controller determines whether to adjust the display image of the projector according to the first angle information.

In order to achieve one or a part or all of the above or other objects, an embodiment of the disclosure provides a projection method. The projection method includes: projecting a display image onto a screen by a projector; measuring first angle information of the screen by a first posture sensor disposed on the screen, wherein a disposition direction of the first posture sensor is parallel to a normal direction of the screen; and determining, by a correction controller, whether to adjust the display image of the projector according to the first angle information.

Based on the above, the embodiments of the disclosure have at least one of the following advantages or effects. In the projection system and projection method of the disclosure, the first posture sensor is used to measure the first angle information of the screen, and the correction controller determines whether to correct the display image accordingly, so as to quickly correct the display image. The projection system and projection method of the disclosure may have lower hardware requirements and shorter correction processing time.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting.

Figure 1A:
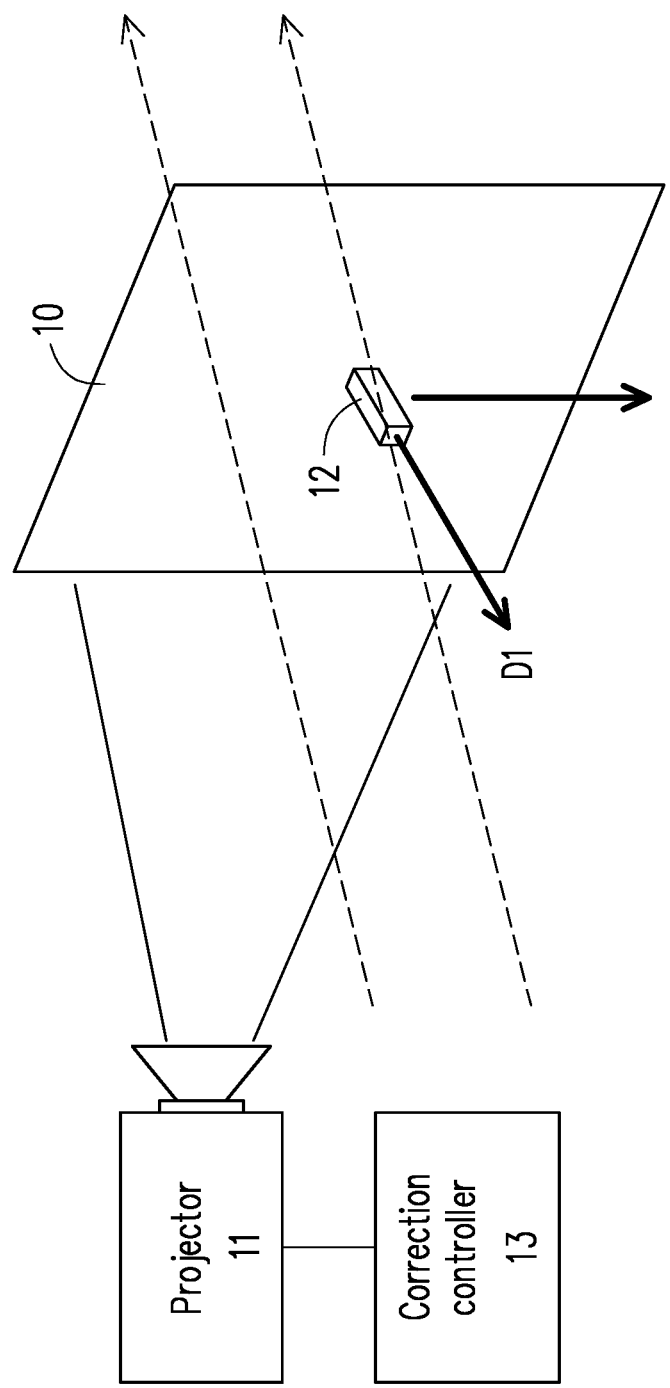
FIG. 1A is a schematic diagram of a projection system according to an embodiment of the disclosure.

Please refer to FIG. 1A; FIG. 1A is a schematic diagram of a projection system according to an embodiment of the disclosure. A projection system 1 includes a screen 10, a projector 11, a first posture sensor 12 and a correction controller 13. The projector 11 may be configured to project a display image onto the screen 10. The first posture sensor 12 is disposed on the screen 10. For example, the first posture sensor 12 may be disposed on the frame of the screen 10 or on the back of the screen 10, or may be disposed at other positions according to actual design requirements. The disposition direction of the first posture sensor 12 is parallel to a normal direction D1 of the screen 10; that is, the first posture sensor 12 is configured to measure first angle information of the screen 10. The first posture sensor 12 may provide the first angle information to the correction controller 13.

In some embodiments, the correction controller 13 is communicatively connected (electrically connected) to the first posture sensor 12. After receiving the first angle information, the correction controller 13 may determine whether the display image projected by the projector 11 needs to be corrected according to the first angle information, for example, to correct the shape or size of the display image. The correction controller 13 and the first posture sensor 12 may be connected by wired transmission or wireless transmission. For example, the wired transmission method may include, for example, a local area network (LAN) interface, a universal serial bus (USB) interface, and/or other suitable wired transmission methods. The wireless transmission method may include a wireless fidelity (WiFi) communication interface, a Bluetooth communication interface, an infrared radiation (IR) communication interface, a ZigBee communication interface and/or other suitable wireless transmission methods. In an embodiment, the correction controller 13 may be integrally disposed in the projector 11, thereby increasing the convenience of the overall projection system 1 in installation. In another embodiment, the projector 11 and the correction controller 13 may be disposed separately, so that the user may set the positions of the projector 11 and the correction controller 13 in the projection system 1 according to different needs, which increases flexibility of the projection system 1 in installation.

Figure 1B:
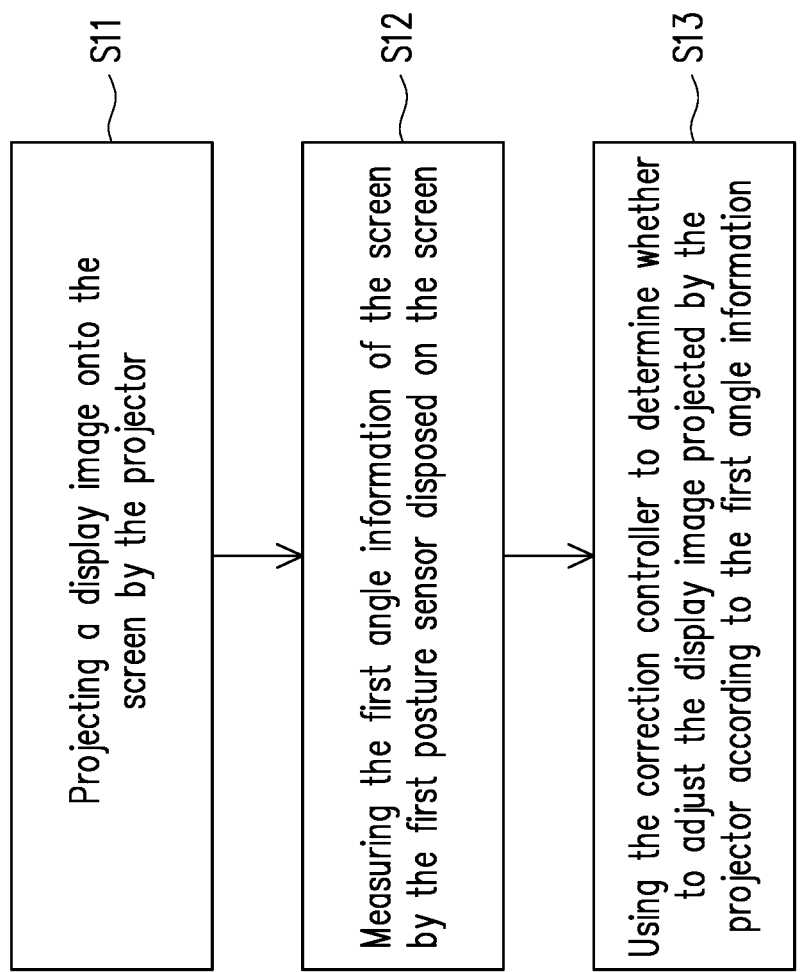
FIG. 1B is a schematic diagram of a projection method according to an embodiment of the disclosure.

FIG. 1B is a schematic diagram of a projection method according to an embodiment of the disclosure. The projection method shown in FIG. 1B may be applied to the projection system 1 shown in FIG. 1A, so that the projection system 1 may adaptively sense the disposition direction of the screen 10 to correct the display image projected by the projector 11.

In some embodiments, in step S11, the projector 11 may project a display image onto the screen 10. In detail, the projection direction of the projector 11 may be adjusted according to the angle relationship between the projector 11 and the screen 10, so that the display image may be projected onto the screen 10 at a better angle. Furthermore, the projection system 1 may be preset to obtain the angle information of the projector 11 so that the projector 11 may project a display screen. For example, the correction controller 13 has a storage device (not shown). When the projector 11 is disposed in a hanging way, the projection system 1 may pre-store or set the angle information of the projector 11 in the storage device of the correction controller 13, so that the correction controller 13 may generate a corresponding display image in advance based on the angle information. In this way, the projector 11 may project a corrected display image.

In some embodiments, in step S12, the projection system 1 may measure the first angle information of the screen 10 with the first posture sensor 12 disposed on the screen 10. Since the first posture sensor 12 is disposed in the normal direction D1 of the screen 10, the first angle information sensed by the first posture sensor 12 is with respect to the normal direction D1 of the screen 10. For example, the screen 10 may be a hanging type drop-down screen, a vertical type pull-up screen, a bracket type screen or other suitable plane screens. When the display plane angle of the screen 10 changes according to different usage conditions, the first posture sensor 12 may measure the corresponding first angle information, and the first posture sensor 12 provides the first angle information to the correction controller.

Specifically, the first posture sensor 12 may obtain three-dimensional first angle information. In an embodiment, in order to obtain the three-dimensional first angle information, the first posture sensor 12 may include a magnetic induction sensor and a gravity sensor. The magnetic induction sensor may perform sensing according to the relationship between the normal direction D1 of the screen 10 and the direction of the magnetic field lines of the Earth (shown by the dotted lines in FIG. 1A). The gravity sensor may perform sensing according to the relationship between the normal direction D1 of the screen 10 and the direction of the gravity line of the Earth (shown by the black line perpendicular to the normal direction D1 in FIG. 1A). In detail, the magnetic induction sensor may sense the pitch angle and the yaw angle between the normal direction D1 of the screen 10 and the direction of the magnetic field lines of the Earth, and the gravity sensor may sense the pitch angle and the roll angle between the normal direction D1 of the screen 10 and the direction of the gravity line of the Earth. Since the angle information sensed by the magnetic induction sensor and the gravity sensor all correspond to the ground coordinate system, the first posture sensor 12 may obtain the three-dimensional first angle information of the screen 10 with respect to the ground coordinate system according to the respective sensing results of the magnetic induction sensor and the gravity sensor, and may provide the first angle information to the correction controller 13. A second posture sensor 34 to be described later also includes a magnetic induction sensor and a gravity sensor to obtain three-dimensional second angle information.

Figure 2:
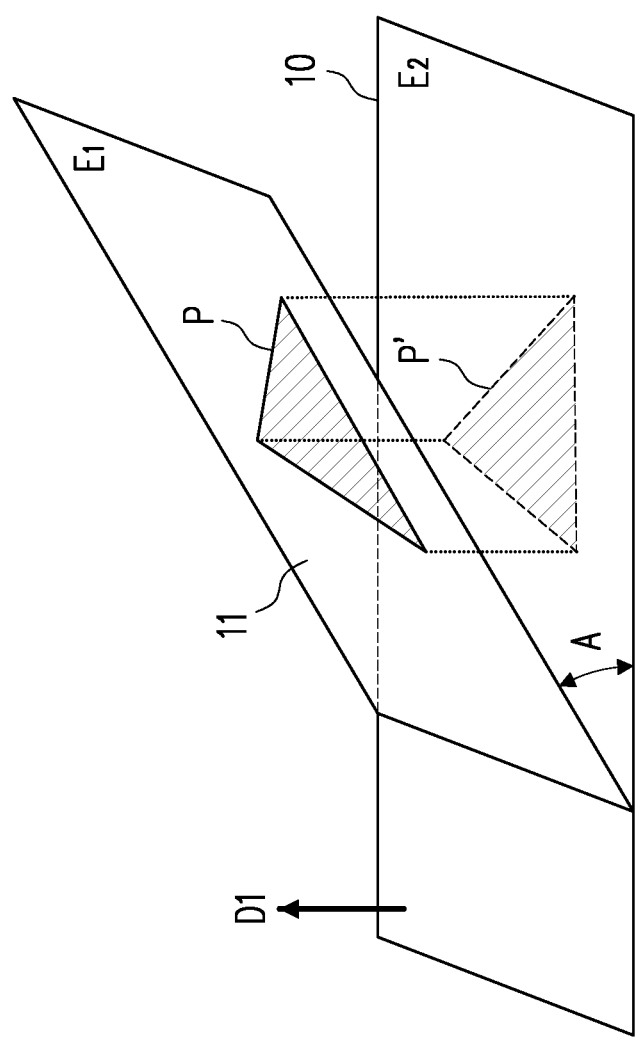
FIG. 2 is a schematic diagram of the correction of the projection of the projector to the screen in the projection system according to an embodiment of the disclosure.

In step S13, the projection system 1 may use the correction controller 13 to determine whether to adjust the display image projected by the projector 11 according to the first angle information. Please refer to FIG. 2 for illustration of the details of the correction performed by the correction controller 13. FIG. 2 is a schematic diagram of the correction of the projection of the projector 11 to the screen 10 in the projection system 1 according to an embodiment of the disclosure. Some components are omitted in FIG. 2 to simplify the description.

Please refer to FIG. 2. People skilled in the art may know that in a plane space, the projector 11 has a projection plane $E_1$ and the screen 10 has a display plane $E_2$. The screen 10 may generate a corrected display image P'. For the convenience of description, the mapping relationship between a compensating display image P and a corrected display image P' is shown in FIG. 2.

In detail, there is an included angle A between the projection plane $E_1$ of the projector 11 and the display plane $E_2$ of the screen 10. Based on Euclid's theorem or the right triangle altitude theorem, the compensating display image P of the projector 11 may be calculated to thereby form the corrected display image P' when projected on the screen 10. In this case, due to the included angle A between the projection plane $E_1$ and the display plane $E_2$, the display image is deformed. Therefore, the original display image is deformed (compensated) into the compensating display image P in the projector 11 by the above method, and after correction, the projector 11 projects the corrected display image P' to complete the correction of the shape and size of the display image.

The disclosure may perform image geometric compensation for the original display image according to the included angle A, so that the corrected display image P' projected by the projector 11 may allow the viewer to watch the display image without deformation.

In step S13, the correction controller 13 may determine the included angle A according to the first angle information, thereby determining whether the display image needs to be corrected. For example, the projector 11 in the projection system 1 may have a preset projection angle (for example, the included angle A between the projection plane $E_1$ of the projector 11 and the display plane $E_2$ of the screen 10 is 30 degrees). When the display image is projected onto the screen 10, the correction controller 13 may determine whether the included angle A between the projector 11 and the screen 10 is within a preset angle range (for example, the preset angle range is 25 degrees to 35 degrees) according to the first angle information. When the correction controller 13 determines that the included angle A exceeds the preset angle range according to the first angle information, the correction controller 13 may perform corresponding correction on the display image according to the first angle information. For example, the correction controller 13 may perform a correction calculation on the display image according to the included angle A by geometric correction and keystone correction, so that the projector 11 may project a display image that fits the position and angle relationship between the screen 10 and the projector 11.

In another embodiment, in the projection method shown in FIG. 1B, the order of steps S11 to S13 may be different. For example, the step of projecting the display image onto the screen 10 by the projector 11 performed by the projection system 1 in step S11 may be changed to after step S12 or after step S13. For example, when the projector 11 in the projection system 1 is just started, the projection system 1 may choose to perform step S12 or step S13 first before performing step S11. In other words, the projection system 1 may measure the first angle information by the first posture sensor 12 before projecting the display image onto the screen 10. Alternatively, the correction controller 13 in the projection system 1 may determine whether to correct the display image according to the first angle information before projecting the display image onto the screen 10.

In short, since according to the projection method shown in FIG. 1B, the projection system 1 may determine whether to correct the display image projected by the projector 11 according to the first angle information measured by the first posture sensor 12, in the case where the projection system 1 does not need to perform a large amount of image processing, the projection system 1 and the projection method of the disclosure can have lower hardware requirements and shorter correction processing time. In addition, the projection system 1 and the projection method may be better adapted to the disposition angle between the projector 11 and the screen 10, so that the display image projected by the projector 11 may be automatically corrected according to different usage scenarios. Therefore, the projection system 1 and the projection method may effectively reduce the operation complexity for the user and improve the viewing experience at the same time.

Figure 3A:
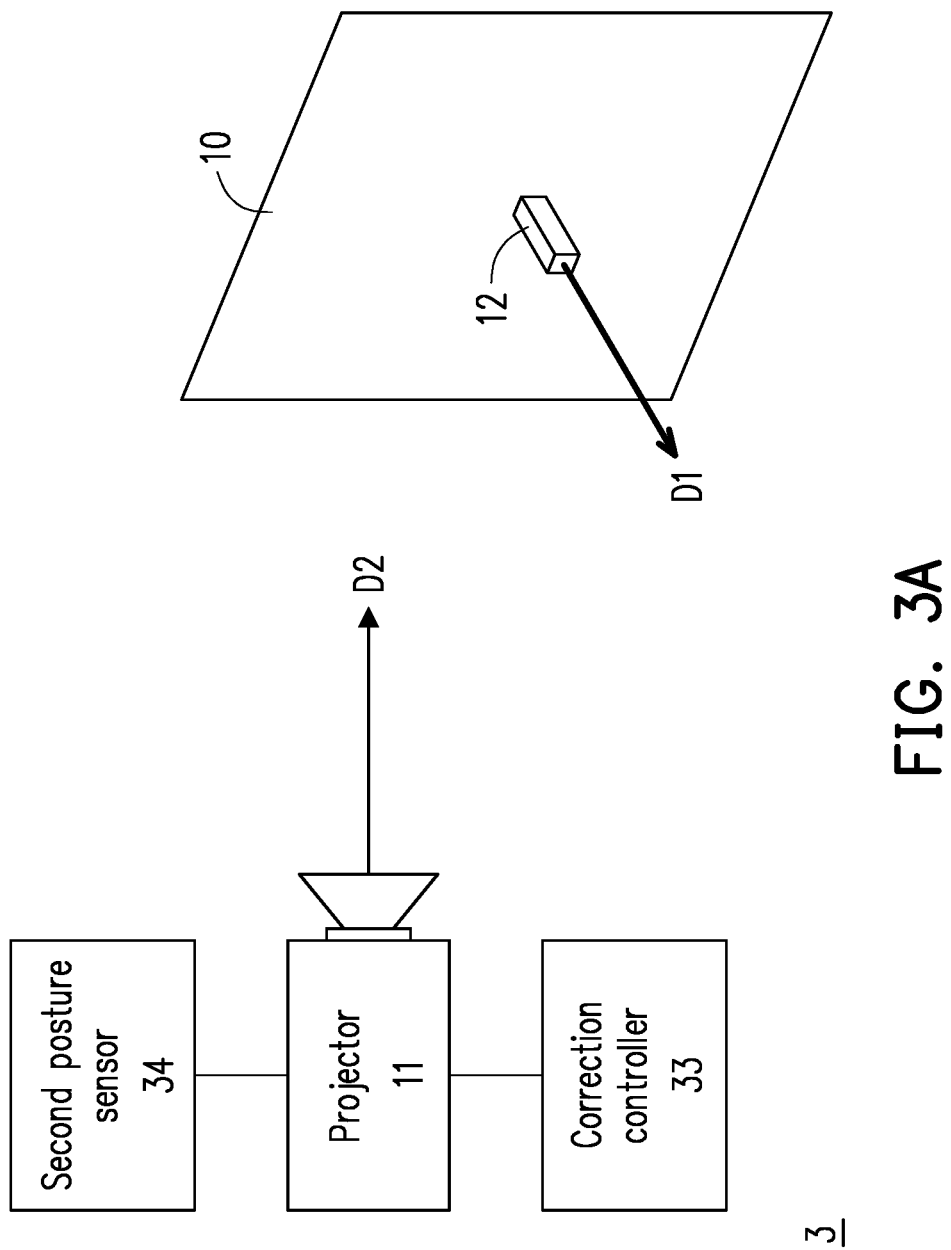
FIG. 3A is a schematic diagram of a projection system according to another embodiment of the disclosure.

Please refer to FIG. 3A; FIG. 3A is a schematic diagram of a projection system 3 according to another embodiment of the disclosure. The projection system 3 includes the screen 10, the projector 11, the first posture sensor 12, a correction controller 33 and a second posture sensor 34. The projection system 3 shown in FIG. 3A is similar to the projection system 1 shown in FIG. 1A. The difference is that the second posture sensor 34 is disposed in the projection system 3. The second posture sensor 34 may be disposed on the projector 11, and the disposition direction of the second posture sensor 34 is parallel to a projection direction D2 of the projector 11. The second posture sensor 34 may be configured to sense the projection direction D2 of the projector 11 to obtain second angle information with respect to the projection direction D2, and the second posture sensor 34 may provide the second angle information to the correction controller 33.

In detail, in order to obtain the three-dimensional second angle information, the second posture sensor 34 may include a magnetic induction sensor and a gravity sensor. Specifically, the magnetic induction sensor may perform sensing according to the projection direction D2 of the projector 11 and the direction of the magnetic field lines of the Earth, and the gravity sensor may perform sensing according to the projection direction D2 of the projector 11 and the direction of the gravity line of the Earth. That is, the magnetic induction sensor may sense the pitch angle and the yaw angle between the projection direction D2 of the projector 11 and the direction of the magnetic field lines of the Earth, and the gravity sensor may sense the pitch angle and the roll angle between the projection direction D2 of the projector 11 and the direction of the gravity line of the Earth. Since the angle information sensed by the magnetic induction sensor and the gravity sensor all correspond to the ground coordinate system, the second posture sensor 34 may obtain the three-dimensional second angle information of the projector 11 with respect to the ground coordinate system according to the respective sensing results of the magnetic induction sensor and the gravity sensor, and may provide the second angle information to the correction controller 33.

In some embodiments, the correction controller 33 of the projection system 3 is communicatively connected to the second posture sensor 34, and the correction controller 33 may obtain the second angle information. In other words, the correction controller 33 in the projection system 3 may determine whether to correct the display image projected by the projector 11 according to the first angle information and the second angle information.

Figure 3B:
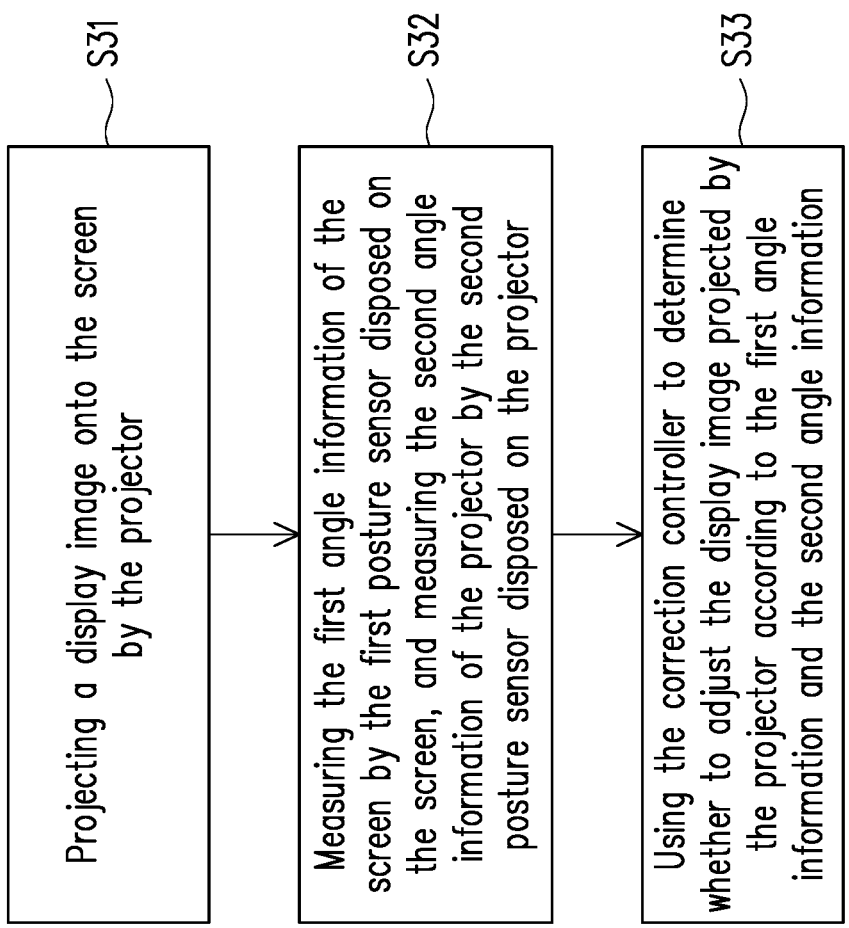
FIG. 3B is a schematic diagram of a projection method according to another embodiment of the disclosure.

FIG. 3B is a schematic diagram of a projection method according to another embodiment of the disclosure. The projection method shown in FIG. 3B may be applied to the projection system 3 shown in FIG. 3A, so that the projection system 3 may adaptively sense the disposition direction of the screen 10 to correct the display image projected by the projector 11.

In step S31, the projector 11 may project a display image onto the screen 10.

In step S32, in addition to sensing the first angle information with respect to the normal direction D1 of the screen 10 by the first posture sensor 12, the projection system 3 may also use the second posture sensor 34 to sense the second angle information with respect to the projection direction D2 of the projector 11. In detail, the disposition direction of the second posture sensor 34 is parallel to the projection direction D2 of the projector 11; that is, the second posture sensor 34 may sense the second angle information corresponding to the projection direction D2 of the projector 11. The second posture sensor 34 may provide the sensed second angle information to the correction controller 33.

In step S33, the correction controller 33 may determine whether to adjust the display image projected by the projector 11 according to the first angle information and the second angle information. In this embodiment, the correction controller 33 of the projection system 3 may determine whether the included angle between the projection direction D2 of the projector 11 and the display direction D1 of the screen 10 is within a preset angle range based on both the first angle information and the second angle information simultaneously. Further, when the correction controller 33 determines that the included angle between the projection direction D2 of the projector 11 and the display direction D1 of the screen 10 exceeds the preset angle range according to the first angle information and the second angle information, the correction controller 33 may perform corresponding correction on the display image projected by the projector 11. That is, the shape and size of the display image are adjusted by means of software, hardware or applications. The above-mentioned software, hardware or applications may be stored in the correction controller 33.

In an embodiment, after step S32, after the correction controller 33 obtains the first angle information and the second angle information, the projector 11 may display the first angle information and the second angle information on the screen menu (on-screen display, OSD); that is, the pitch angle, roll angle, and yaw angle of the screen 10 and the pitch angle, roll angle, and yaw angle of the projector 11 are displayed on the screen menu. In another embodiment, the projection system 3 may be connected to an external device (a computer, a mobile phone or a handheld computing device), and may provide information such as the pitch angle, roll angle, and yaw angle of the screen 10 and the pitch angle, roll angle, and yaw angle of the projector 11 to the external device for display. In this way, before the projection system 3 displays an image, the user may know the current positional relationship of the projection system 3, and adjust the first angle information and the second angle information according to the result of the display image being projected on the screen 10, thereby adjusting the display image projected by the projector 11.

In another embodiment, in the projection method shown in FIG. 3B, the order of steps S31 to S33 may be different. For example, the step of projecting the display image onto the screen 10 by the projector 11 performed by the projection system 3 in step S31 may be changed to after step S32 or after step S33. In other words, the projection system 3 may perform step S32 first, that is, may measure the first angle information by the first posture sensor 12 and measure the second angle information by the second posture sensor 34 before projecting the display image onto the screen 10 by the projector 11. Alternatively, the projection system 3 may perform step S33 first, that is, may determine whether to adjust the display image projected by the projector 11 according to the first angle information and the second angle information before projecting the display image onto the screen 10.

Therefore, according to the projection method shown in FIG. 3B, the projection system 3 may measure the display direction D1 of the screen 10 and the projection direction D2 of the projector 11 by the first posture sensor and the second posture sensor to accordingly determine whether to correct the display image projected by the projector 11. Therefore, according to the projection method shown in FIG. 3B, the projection system 3 may be better adapted to different usage scenarios to automatically perform correction, thus effectively reducing the operation complexity and improving the viewing experience at the same time.

Figure 4:
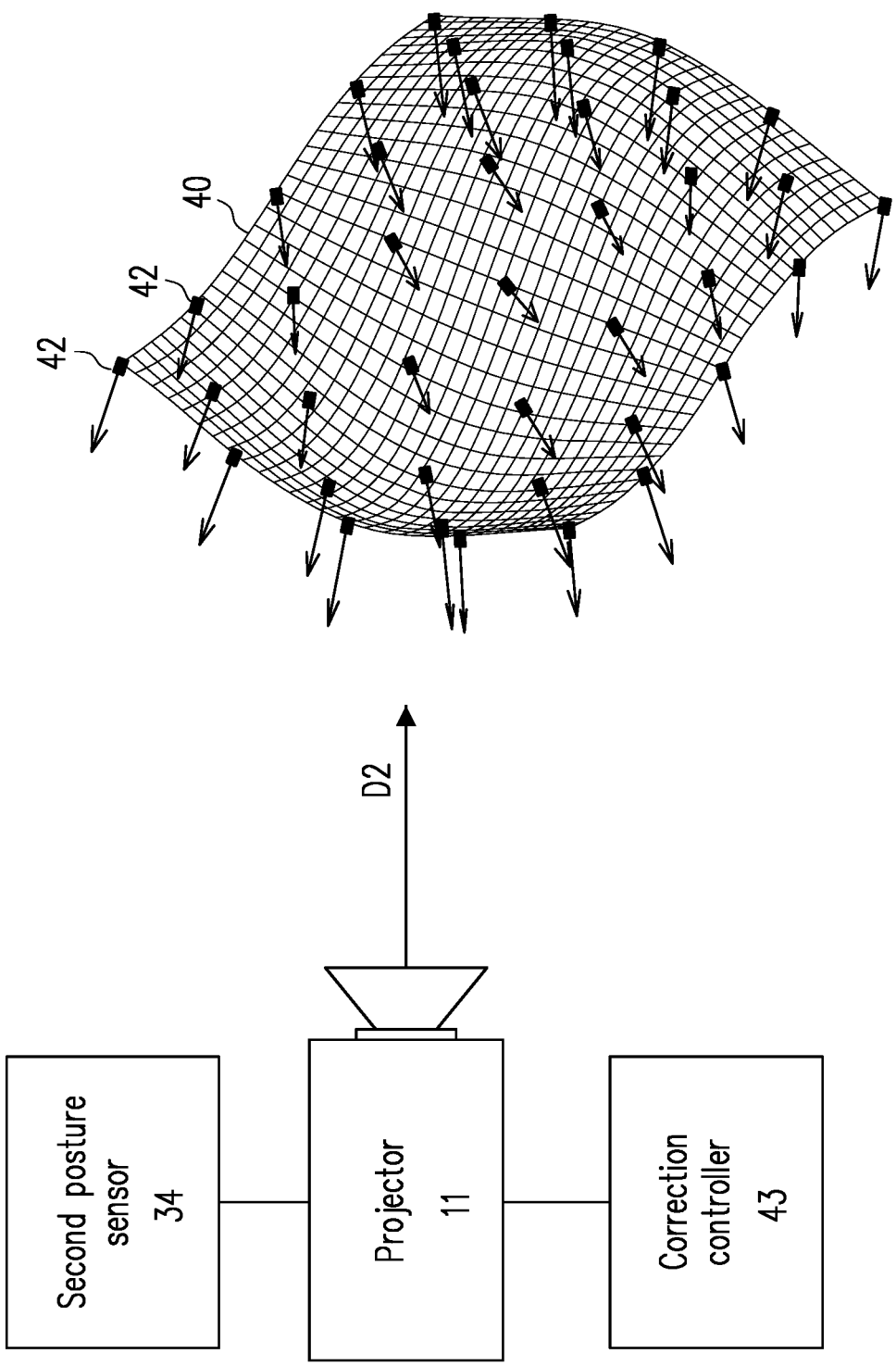
FIG. 4 is a schematic diagram of a projection system according to still another embodiment of the disclosure.

Please refer to FIG. 4; FIG. 4 is a schematic diagram of a projection system 4 according to still another embodiment of the disclosure. The projection system 4 includes a screen 40, the projector 11, multiple first posture sensors 42, a correction controller 43 and the second posture sensor 34. The projection system 4 shown in FIG. 4 is similar to the projection system 3 shown in FIG. 3A. The difference is that the screen 10, the first posture sensor 12 and the correction controller 33 in the projection system 3 are replaced by the screen 40, the first posture sensors 42 and the correction controller 43 in the projection system 4, respectively.

In detail, the screen 40 in the projection system 4 may have a flat or curved display surface, or the display surface of the screen 40 may be attached to or disposed on a flat surface or a curved surface.

In response to the flexible disposition types of the screen 40, the projection system 4 may dispose the multiple first posture sensors 42 at multiple different positions on the screen 40. The disposition directions of the multiple first posture sensors 42 may be respectively parallel to the normal directions of multiple different positions on the display surface of the screen 40. In this way, each first posture sensor 42 may measure the normal direction of the screen 40 at its location to obtain multiple pieces of first angle information. The multiple first posture sensors 42 also provide multiple pieces of measured first angle information to the correction controller 43. The correction controller 43 may receive the multiple pieces of first angle information and the second angle information. The correction controller 43 may calculate the curvature of the screen 40 with respect to the disposition position of each first posture sensor 42 according to the multiple pieces of first angle information, so the correction controller 43 may determine the shape of the display surface of the screen 40. In addition to determining the position and angle relationship between the projection direction D2 of the projector 11 and the display direction of the screen 40 according to the first angle information and the second angle information, the correction controller 43 may also determine the shape of the display surface of the screen 40 according to the first angle information. Therefore, the correction controller 43 may better correct the display image projected by the projector 11 according to the first angle information and the second angle information, so that the projection system 4 may be adapted to different usage conditions.

In another embodiment, the second posture sensor 34 disposed on the projector 11 in the projection system 4 may be omitted, and the projection system 4 may be pre-stored or set so that the correction controller 43 may obtain in advance the disposition angle information between the projector 11 and the screen 40. In this way, the correction controller 43 may obtain the position and/or angle relationship between the projector 11 and the screen 40 according to a preset setting, and determine the shape of the display surface of the screen 40 by obtaining multiple pieces of first angle information. Therefore, the correction controller 43 may determine whether to correct the display image according to the disposition angle of the projector 11 and the first angle information, so that the projector 11 may project a display image that fits the disposition relationship between the screen 40 and the projector 11.

In summary, the embodiments of the disclosure have at least one of the following advantages or effects. In the projection system and projection method of the disclosure, the first posture sensor measures the first angle information parallel to the display direction of the screen, and the correction controller determines whether to correct the display image accordingly, so as to quickly correct the display image. The projection system and projection method of the disclosure may have lower hardware requirements and shorter correction processing time.

However, the above are only exemplary embodiments of the disclosure and are not intended to limit the scope of the disclosure; that is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents and are not intended to limit the scope of the disclosure. In addition, the terms "first," "second" and the like mentioned in the specification or the claims are used only to name the elements or to distinguish different embodiments or scopes and are not intended to limit the upper or lower limit of the number of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
    a screen;
    a projector;
    a first posture sensor; and
    a correction controller,
    wherein the projector projects a display image onto the screen;
    the first posture sensor is disposed on the screen and configured to measure a first angle information of the screen, wherein a disposition direction of the first posture sensor is parallel to a normal direction of the screen; and
    the correction controller is electrically connected to the projector, and the correction controller determines whether to adjust the display image of the projector according to the first angle information.

2. The projection system according to claim 1, wherein the first posture sensor comprises a first magnetic induction sensor and a first gravity sensor, and the first angle information comprises a first pitch angle, a first roll angle and a first yaw angle.

3. The projection system according to claim 1, further comprising:
    a second posture sensor disposed on the projector and configured to measure a second angle information of the projector, wherein a disposition direction of the second posture sensor is parallel to a projection direction of the projector.

4. The projection system according to claim 3, wherein the second posture sensor comprises a second magnetic induction sensor and a second gravity sensor, and the second angle information comprises a second pitch angle, a second roll angle and a second yaw angle.

5. The projection system according to claim 4, wherein the correction controller further calculates an included angle between the projection direction of the projector and the normal direction of the screen according to the first angle information and the second angle information, and the correction controller controls the projector to adjust the display image when the included angle exceeds a preset angle range.

6. The projection system according to claim 5, wherein the correction controller is built in the projector.

7. The projection system according to claim 5, wherein the correction controller is located outside the projector and is communicatively connected with the projector.

8. The projection system according to claim 1, further comprising:
    a plurality of the first posture sensors,
    wherein the screen comprises a plurality of screen areas, and the plurality of first posture sensors are respectively disposed on the plurality of screen areas of the screen to measure angle information of the plurality of screen areas respectively.

9. A projection method, comprising:
    projecting a display image onto a screen by a projector;
    measuring a first angle information of the screen by a first posture sensor disposed on the screen, wherein a disposition direction of the first posture sensor is parallel to a normal direction of the screen; and determining, by a correction controller, whether to adjust the display image of the projector according to the first angle information.

10. The projection method according to claim 9, wherein the first posture sensor comprises a first magnetic induction sensor and a first gravity sensor, and the first angle information comprises a first pitch angle, a first roll angle and a first yaw angle.

11. The projection method according to claim 9, further comprising:

measuring a second angle information of the projector by a second posture sensor disposed on the projector, wherein a disposition direction of the second posture sensor is parallel to a projection direction of the projector.

12. The projection method according to claim 11, wherein the second posture sensor comprises a second magnetic induction sensor and a second gravity sensor, and the second angle information comprises a second pitch angle, a second roll angle and a second yaw angle.

13. The projection method according to claim 12, further comprising:

calculating, by the correction controller, an included angle between the projection direction of the projector and the normal direction of the screen according to the first angle information and the second angle information, and controlling the projector by the correction controller to adjust the display image when the included angle exceeds a preset angle range.

14. The projection method according to claim 9, wherein a plurality of the first posture sensors are provided; and the screen comprises a plurality of screen areas, and the plurality of first posture sensors are respectively disposed on the plurality of screen areas of the screen to measure angle information of the plurality of screen areas respectively.

* * * * *